United States Patent
Keßler et al.

(10) Patent No.: US 11,981,379 B2
(45) Date of Patent: May 14, 2024

(54) REGULATING DEVICE AND METHOD FOR REGULATING THE STEERING ANGLE OF A VEHICLE

(71) Applicant: Continental Automotive GmbH, Hannover (DE)

(72) Inventors: Philipp Keßler, Nierstein (DE); Stefan Feick, Bad Soden (DE); Michael Simon, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/650,182

(22) Filed: Feb. 7, 2022

(65) Prior Publication Data

US 2022/0250678 A1 Aug. 11, 2022

(30) Foreign Application Priority Data

Feb. 8, 2021 (DE) ...................... 10 2021 201 141.1

(51) Int. Cl.
*B62D 6/00* (2006.01)
*B62D 6/08* (2006.01)

(52) U.S. Cl.
CPC ............... *B62D 6/002* (2013.01); *B62D 6/08* (2013.01)

(58) Field of Classification Search
CPC ........ B62D 6/002; B62D 5/0481; B62D 6/08; B62D 6/008; B62D 15/025; B62D 5/046; B62D 15/0235
See application file for complete search history.

(56) References Cited

U.S. PATENT DOCUMENTS

| | | | | |
|---|---|---|---|---|
| 5,105,899 A | * | 4/1992 | Mori | B62D 7/159 701/41 |
| 5,228,757 A | * | 7/1993 | Ito | B60T 8/1755 303/146 |

(Continued)

FOREIGN PATENT DOCUMENTS

| | | | | |
|---|---|---|---|---|
| CN | 104583057 A | * | 4/2015 | ............. B62D 1/286 |
| CN | 111661149 A | * | 9/2020 | ........... B62D 15/029 |

(Continued)

OTHER PUBLICATIONS

"Comparison of Feedback Control Techniques for Torque-Vectoring Control of Fully Electric Vehicles;" De Novellis et al.; IEEE Transactions on Vehicular Technology (vol. 63, Issue: 8, pp. 3612-3623); Oct. 31, 2014. (Year: 2014).*

(Continued)

*Primary Examiner* — Khoi H Tran
*Assistant Examiner* — Jorge O Peche (57) ABSTRACT

A regulating device for regulating the steering angle of a vehicle includes a first controller unit having at least one integrating component and configured to receive a control difference between first steering angle information, which is deduced from nominal steering angle information, and an actual steering angle. The first controller unit provides actuation information for a motor operating the steering. A compensation control circuit superposed on the first controller unit is provided. The compensation control circuit has a feedback path receives actuation information of the motor, (Continued)

the output torque of the motor, and/or information dependent on the output torque of the motor as the input variable and, based on the input variable, provides steering angle compensation information.

16 Claims, 2 Drawing Sheets

(56) References Cited

U.S. PATENT DOCUMENTS

| | | | | |
|---|---|---|---|---|
| 5,343,393 | A * | 8/1994 | Hirano | B62D 15/0245 180/413 |
| 5,506,776 | A * | 4/1996 | Fushimi | B62D 7/148 180/413 |
| 5,508,921 | A * | 4/1996 | Chikuma | B62D 7/1581 701/41 |
| 5,524,079 | A * | 6/1996 | Ishida | B62D 7/159 701/42 |
| 5,606,502 | A * | 2/1997 | Adachi | B62D 7/159 180/408 |
| 5,627,754 | A * | 5/1997 | Asanuma | B62D 7/159 180/408 |
| 5,652,379 | A * | 7/1997 | Fukatani | B62D 7/159 701/99 |
| 5,720,533 | A * | 2/1998 | Pastor | B60T 8/1755 303/140 |
| 5,745,862 | A * | 4/1998 | Hirano | B60T 8/1755 701/1 |
| 5,816,669 | A * | 10/1998 | Hiwatashi | B62D 7/159 303/146 |
| 6,035,251 | A * | 3/2000 | Hac | B60T 8/1755 303/146 |
| 6,056,371 | A * | 5/2000 | Lin | B60T 8/17555 303/146 |
| 6,079,800 | A * | 6/2000 | Lin | B60T 8/1764 701/72 |
| 6,131,688 | A * | 10/2000 | Fukada | B60T 8/175 180/408 |
| 6,175,790 | B1 * | 1/2001 | Lin | B60T 8/17555 701/72 |
| 6,205,374 | B1 * | 3/2001 | Kljima | B60W 10/119 701/1 |
| 6,233,513 | B1 * | 5/2001 | Furukawa | B62D 6/04 701/1 |
| 6,280,008 | B1 * | 8/2001 | Yoshida | B60T 8/3275 303/155 |
| 6,334,656 | B1 * | 1/2002 | Furukawa | B60T 8/1755 303/146 |
| 6,345,218 | B1 * | 2/2002 | Yamanaka | B62D 7/159 701/41 |
| 6,560,524 | B2 * | 5/2003 | Lin | B60T 8/1755 303/140 |
| 7,092,805 | B2 * | 8/2006 | Kasahara | B62D 5/006 701/41 |
| 8,010,253 | B2 * | 8/2011 | Lundquist | B62D 6/003 180/443 |
| 8,024,091 | B2 * | 9/2011 | Takenaka | B60W 50/06 701/72 |
| 8,027,775 | B2 * | 9/2011 | Takenaka | B60W 40/10 701/70 |
| 8,050,822 | B2 * | 11/2011 | Takenaka | B60W 40/064 303/146 |
| 8,086,383 | B2 * | 12/2011 | Takenaka | B60T 8/17552 116/36 |
| 8,155,852 | B2 * | 4/2012 | Takenaka | B60W 10/20 701/72 |
| 9,446,792 | B2 * | 9/2016 | Takeda | B62D 5/04 |
| 2003/0060959 | A1 * | 3/2003 | Lin | B60T 8/1755 701/70 |
| 2004/0026158 | A1 * | 2/2004 | Rieth | B62D 5/0481 180/405 |
| 2006/0080016 | A1 * | 4/2006 | Kasahara | B62D 6/008 701/41 |
| 2008/0021614 | A1 * | 1/2008 | Endo | B62D 6/008 701/41 |
| 2009/0012669 | A1 * | 1/2009 | Takenaka | B60W 10/20 701/31.4 |
| 2009/0024280 | A1 * | 1/2009 | Kato | B62D 5/008 701/41 |
| 2009/0024281 | A1 * | 1/2009 | Hwang | B62D 6/008 701/41 |
| 2009/0026003 | A1 * | 1/2009 | Kato | B62D 5/008 180/446 |
| 2009/0118905 | A1 * | 5/2009 | Takenaka | B62D 6/04 701/41 |
| 2009/0132137 | A1 * | 5/2009 | Takenaka | B60W 40/101 701/70 |
| 2009/0171526 | A1 * | 7/2009 | Takenaka | B60W 40/101 701/70 |
| 2009/0187302 | A1 * | 7/2009 | Takenaka | B62D 6/04 701/33.8 |
| 2009/0319114 | A1 * | 12/2009 | Takenaka | B60W 10/04 701/48 |
| 2010/0094505 | A1 * | 4/2010 | Kariatsumari | B62D 5/046 701/41 |
| 2012/0046836 | A1 * | 2/2012 | Strecker | B62D 6/008 701/41 |
| 2012/0072074 | A1 * | 3/2012 | Greul | B62D 6/008 701/41 |
| 2014/0343794 | A1 * | 11/2014 | Tamaizumi | B62D 5/0463 701/42 |
| 2014/0350789 | A1 * | 11/2014 | Anker | B60W 50/082 701/41 |
| 2015/0057889 | A1 * | 2/2015 | Tamaizumi | B62D 5/0463 701/41 |
| 2015/0191199 | A1 * | 7/2015 | Tsubaki | B62D 6/10 701/42 |
| 2016/0129934 | A1 | 5/2016 | Akatsuka et al. | |
| 2016/0176440 | A1 * | 6/2016 | Witte | G05D 1/0061 701/23 |
| 2016/0244092 | A1 | 8/2016 | Matsuo | |
| 2016/0355212 | A1 * | 12/2016 | Takaso | B62D 1/28 |
| 2017/0113720 | A1 * | 4/2017 | Kodera | B62D 5/0472 |
| 2017/0137055 | A1 * | 5/2017 | Hirate | B62D 6/008 |
| 2017/0267276 | A1 * | 9/2017 | Kodera | B62D 6/08 |
| 2017/0282966 | A1 * | 10/2017 | Fukuda | B62D 5/0463 |
| 2018/0015945 | A1 * | 1/2018 | Kim | B62D 6/08 |
| 2018/0015947 | A1 * | 1/2018 | Akatsuka | B62D 15/025 |
| 2018/0201306 | A1 * | 7/2018 | Tsubaki | B62D 1/286 |
| 2018/0354549 | A1 * | 12/2018 | Tsubaki | H02P 29/032 |
| 2018/0362074 | A1 * | 12/2018 | Badiru | B62D 5/001 |
| 2019/0054953 | A1 | 2/2019 | Dreyer | |
| 2019/0084613 | A1 * | 3/2019 | Tsubaki | B62D 1/286 |
| 2019/0193782 | A1 * | 6/2019 | Tsubaki | B62D 6/007 |
| 2019/0256133 | A1 * | 8/2019 | Tsubaki | B62D 6/008 |
| 2019/0263391 | A1 * | 8/2019 | Matsunaga | G06V 20/56 |
| 2019/0322311 | A1 * | 10/2019 | Aoki | B62D 6/008 |
| 2019/0322313 | A1 | 10/2019 | Münch | |
| 2019/0337556 | A1 * | 11/2019 | Tsubaki | B62D 6/007 |
| 2019/0359247 | A1 * | 11/2019 | Tsubaki | B62D 1/286 |
| 2020/0180680 | A1 * | 6/2020 | Han | B62D 6/008 |
| 2020/0283063 | A1 * | 9/2020 | Kashi | B62D 6/008 |
| 2020/0398893 | A1 | 12/2020 | Shoji et al. | |
| 2021/0061344 | A1 * | 3/2021 | Kitazume | B62D 1/286 |
| 2022/0144334 | A1 * | 5/2022 | Kakas | B62D 6/008 |
| 2022/0250678 | A1 * | 8/2022 | Keßler | B62D 6/002 |
| 2022/0250679 | A1 * | 8/2022 | Kakas | B62D 5/0463 |
| 2022/0306188 | A1 * | 9/2022 | Min | B62D 6/008 |

FOREIGN PATENT DOCUMENTS

| | | | | |
|---|---|---|---|---|
| CN | 113696965 | A * | 11/2021 | B62D 5/0463 |
| DE | 19842439 | A1 * | 3/1999 | B62D 6/008 |
| DE | 102005049042 | A1 * | 4/2006 | B62D 5/006 |
| DE | 102012214847 | A1 | 3/2014 | |
| DE | 102014208785 | A1 | 11/2015 | |
| DE | 102014226781 | A1 | 6/2016 | |
| DE | 102016215724 | A1 | 2/2018 | |

(56) References Cited

FOREIGN PATENT DOCUMENTS

| | | | | |
|---|---|---|---|---|
| DE | 102018206089 A1 | 10/2019 | | |
| DE | 102019210509 A1 | 1/2021 | | |
| EP | 0718174 A2 * | 6/1996 | | |
| EP | 1097855 A2 * | 5/2001 | ............ | B62D 5/006 |
| EP | 1880921 A2 * | 1/2008 | ........... | B62D 5/0463 |
| EP | 2221235 A2 * | 8/2010 | ........... | B62D 5/0463 |
| EP | 3712036 A1 * | 9/2020 | ........... | B62D 15/029 |
| JP | H08175404 A * | 7/1996 | | |
| JP | 2000198453 A * | 7/2000 | ........... | B62D 6/003 |
| JP | 2001177906 A * | 6/2001 | | |
| JP | 3630278 B2 * | 3/2005 | | |
| JP | 3647285 B2 * | 5/2005 | | |
| JP | 2009051491 A * | 3/2009 | ........... | B62D 15/025 |
| JP | 2010208592 A * | 9/2010 | | |
| JP | 2014227115 A * | 12/2014 | | |
| JP | 2015020604 A * | 2/2015 | | |
| JP | 2016088436 A | 5/2016 | | |
| JP | 2016147590 A | 8/2016 | | |
| JP | 2019025961 A | 2/2019 | | |
| JP | 2021000950 A | 1/2021 | | |
| WO | WO-2009017199 A1 * | 2/2009 | ........... | B62D 15/025 |
| WO | WO-2014162769 A1 * | 10/2014 | ............ | B62D 1/286 |
| WO | WO-2019026351 A1 * | 2/2019 | ............ | B62D 1/286 |
| WO | WO-2020178242 A1 * | 9/2020 | ............ | B62D 5/001 |
| WO | WO-2020178243 A1 * | 9/2020 | ........... | B62D 5/0463 |

OTHER PUBLICATIONS

"Integration of optimal maneuver prediction in active safety control systems: considerations on driving safety improvements;" Biral et al., 2010 IEEE International Conference on Control Applications (pp. 173-178); Sep. 1, 2010. (Year: 2010).*

"The development of vehicle stability control at Ford;" Tseng et al.; IEEE/ASME Transactions on Mechatronics (vol. 4, Issue: 3, pp. 223-234); Sep. 1, 1999. (Year: 1999).*

"Research of Automotive Steer-by-Wire Control Based on Integral Partition PID Control;" Fu et al.; 2009 Third International Conference on Genetic and Evolutionary Computing (pp. 561-564); Mar. 12, 2010. (Year: 2010).*

German Search Report dated Aug. 12, 2021 for the counterpart German Patent Application No. 10 2021 201 141.1.

Search Report dated Oct. 7, 2022 from corresponding Japanese patent application No. 2021-197883.

Office Action dated Dec. 12, 2022 from corresponding Japanese patent application No. 2021-197883.

* cited by examiner

REGULATING DEVICE AND METHOD FOR REGULATING THE STEERING ANGLE OF A VEHICLE

CROSS-REFERENCE TO RELATED APPLICATIONS

The present application claims priority to German patent application No. 10 2021 201 141.1, filed on Feb. 8, 2021, which is hereby incorporated by reference.

TECHNICAL FIELD

The technical field relates to a regulating device and to a method for regulating the steering angle of a vehicle.

BACKGROUND

Electromechanical steering systems for vehicles (also EPS: Electric Power Steering) are in principle known. A program-controlled electric actuator supports and superposes the steering movements of the driver by transferring forces to the steering mechanics.

In addition, it is known that electromechanical steering systems have regulating devices in order to moderate or suppress disturbing influences. Such regulating devices have an integrating regulating component in order to compensate for the transverse forces building up.

Known regulating devices have an interface via which the control behavior can be adjusted, for example, in a manner that depends on the driving conditions or the situation. This can reduce oscillating steering movements of the electromechanical steering system during autonomous or partially autonomous driving and improve cooperative driving in which the driver and the steering actuator simultaneously control the vehicle. A disadvantage of the integrating regulating component is namely that a deviation of the steering angle occasioned by the human driver with respect to the steering angle calculated by the steering angle regulation occasions an increasing counter-steering torque of the actuator, which is perceived as being very disturbing during cooperative driving. This can be prevented or at least moderated by influencing the control behavior via the interface of the regulating device.

It is problematic that it is not possible to influence the control behavior in the manner described if the regulating device does not have such an interface or the construction of the regulating device is not known and it is therefore not possible to compensate for unwanted control behavior in a manner that depends on the driving situation. Thus, loading integrating components in the steering angle regulation can then, for example, continue to cause unwanted vehicle behavior.

As such, it is desirable to present a regulating device which makes it possible to influence the regulating behavior of the steering angle regulation even if no interface with such influencing is provided.

SUMMARY

According to a first aspect, the disclosure present a regulating device for regulating the steering angle of a vehicle. The regulating device includes a first controller unit, the regulating behavior of which has at least one integrating component. The first controller unit is configured to receive the control difference between the first steering angle information, which is deduced from nominal steering angle information, and the actual steering angle and to provide actuation information for a motor operating the steering. The nominal steering angle information can be provided by a driving assistance system, for example, which makes it possible to control the vehicle autonomously or partially autonomously.

In addition, a compensation control circuit superposed on the first controller unit is provided. The compensation control circuit has a feedback path which receives actuation information of the motor, the output torque of the motor and/or information dependent on the output torque of the motor as the input variable and, based on said input variable, provides steering angle compensation information. Based on the steering angle compensation information, an adjustment of the nominal steering angle information is effected and therefore the first steering angle information is formed. In particular, a subtraction point is provided, which receives the nominal steering angle information and the steering angle compensation information and outputs the first steering angle information as a subtraction result. The control behavior of the compensation control circuit can be modified depending on at least one control variable, wherein the control variable is an influence quantity of the human driver on the steering device and/or a driving situation-dependent measured variable. An influence quantity of the human driver can be the torque which the driver applies to the steering wheel of the vehicle. The driving situation-dependent measured variable can be the curvature of the bend for example, i.e., the reciprocal of the bend radius, or the vehicle speed.

The technical advantage of the method described herein is that regulating compensation can be achieved by the superposed compensation control circuit based on available information, which regulating compensation makes it possible to improve the regulating behavior and in particular avoids oscillations and reduces disturbing influences of the integrating regulating component.

According to an exemplary embodiment, the first controller unit is a PID controller or the first controller unit has a PID controller. The control behavior of a PID controller has an advantageous regulating behavior for the steering angle regulation.

According to an exemplary embodiment, the first controller unit is a self-contained controller unit which does not have an external interface via which the control behavior of the first controller unit can be adjusted. In other words, the first controller unit forms a so-called black box, the control behavior of which cannot be adjusted externally so that a situation-dependent change in the control behavior would be possible. However, the compensation control circuit superposed on the first controller unit as a subordinate controller unit makes it possible to compensate for the absence of such an interface by an external control loop.

According to an exemplary embodiment, the first controller unit provides nominal torque information as actuation information of the motor. The first controller unit receives the control difference between the first steering angle information and the actual steering angle as input information and converts this into nominal torque information, based on which the motor is actuated. The motor contains a motor regulation which converts the nominal torque information into a motor torque.

According to an exemplary embodiment, the input variable of the feedback path of the compensation control circuit is nominal torque information of the first controller unit, the current intensity of the electrical torque-forming current flowing through the motor or measurement information proportional to said current intensity, for example the voltage drop over a resistor flowed through by the motor current or the electrical moment. These input variables are also available in self-contained controller units, since they are either the input information or the output information of the first controller unit, i.e., measurement signals which can be captured at the input or output interfaces of the first controller unit, or measurement signals which are available at the electric motor of the steering system.

According to an exemplary embodiment, the compensation control circuit, in particular the feedback path of this compensation control circuit, has a first control element which is configured as a threshold-dependent dead zone. As a result, an input variable threshold can be adjusted, above and/or below which the compensation control circuit is effective.

According to an exemplary embodiment, the first control element is configured to output an output variable having the value 0, if the input variable thereof, in particular the input variable of the feedback path of the compensation control circuit, lies below an input variable threshold. As a result, it is possible to deactivate the compensation control circuit for low input variables.

According to an exemplary embodiment, the threshold of the dead zone, i.e., the input variable threshold, can be modified depending on the at least one control variable. As a result, the activation threshold of the compensation control circuit can be adjusted in a manner that depends on the driving situation or driving conditions.

According to an exemplary embodiment, the regulating device is configured to calculate the threshold of the dead zone based on a first mathematical function depending on the at least one control variable. As a result, the effect of the control variable on the threshold of the dead zone can be adjusted. The first mathematical function can be a monotonically nondecreasing or a monotonically nonincreasing function, for example. In the event that multiple control variables are used, the first mathematical function can be configured to calculate the threshold based on multiple control variables as the input variables.

According to an exemplary embodiment, the compensation control circuit, in particular the feedback path of the compensation control circuit, has a second control element which is configured as a low-pass filter or has a low-pass behavior. As a result, high-frequency components of the input variable of the feedback path can be filtered out so that oscillations can be avoided and the low-frequency components, i.e., the slowly changing components of the input variable, which originate from the integrating regulating part, are taken greater account of during the compensation.

According to an exemplary embodiment, the second control element is a PT1 element or a PT element of a higher order or has such a PT1 element or PT element of a higher order.

According to an exemplary embodiment, the control behavior of the second control element can be modified depending on the at least one control variable. As a result, the control behavior of the compensation control circuit can be adjusted in a manner that depends on the driving situation or driving conditions.

According to an exemplary embodiment, the regulating device is configured to calculate the control behavior of the second control element based on a second mathematical function depending on the at least one control variable. As a result, the effect of the control variable on the control behavior of the second control element can be adjusted. The second mathematical function can be a monotonically nondecreasing or monotonically nonincreasing function, for example. In the event that multiple control variables are used, the second mathematical function can be configured to carry out a calculation of an output variable influencing the control behavior of the second control element based on multiple control variables as the input variables.

According to an exemplary embodiment, the compensation control circuit, in particular the feedback path of the compensation control circuit, has a third control element which is configured as a limiter. As a result, a limiting of the effect of the compensation control circuit, in particular a limiting of the output signal of the feedback path of the compensation control circuit, can be achieved in order to avoid too high a back-coupling effect for safety reasons.

According to an exemplary embodiment, the limiter has a threshold as of which the amplitude of the output signal is limited. The threshold can be modified depending on the at least one control variable. As a result, the threshold of the limiter can be adjusted in a manner that depends on the driving situation or driving conditions.

According to an exemplary embodiment, the regulating device is configured to calculate the threshold of the third control element based on a third mathematical function depending on the at least one control variable. As a result, the effect of the control variable on the threshold of the limiter can be adjusted. The third mathematical function can be a monotonically nondecreasing or monotonically nonincreasing function, for example. In the event that multiple control variables are used, the third mathematical function can be configured to calculate the threshold based on multiple control variables as the input variables.

According to a further aspect, the disclosure presents a method for regulating the steering angle of a vehicle by means of a regulating device. The regulating device comprises a first controller unit, the regulating behavior of which has at least one integrating component. The first controller unit receives the control difference between the first steering angle information, which is deduced from nominal steering angle information, and an actual steering angle and provides actuation information for a motor operating the steering. In addition, a compensation control circuit superposed on the first controller unit is provided, the feedback path of which receives actuation information of the motor, the output torque of the motor or information dependent on the output torque of the motor as the input variable and, based on said input variable, provides steering angle compensation information. Based on the steering angle compensation information, the nominal steering angle information is adjusted and the first steering angle information is formed. In particular, the first steering angle information is produced by subtracting the steering angle compensation information from the nominal steering angle information provided by the driving assistance system. The control behavior of the compensation control circuit is modified depending on at least one control variable, wherein the control variable is an influence quantity of the human driver on the steering device and/or a driving situation-dependent measured variable.

The term "superposed control circuit" is understood to be a control circuit which influences the control variable of a subordinate controlled system, i.e., a lower regulating structure viewed in terms of hierarchy. The superposed control circuit can use a signal or information from the subordinate controlled system in order to influence the control behavior of the subordinate controlled system as a result.

Within the meaning of the invention, the expressions "approximately", "substantially" or "roughly" mean deviations from the exact value in each case by +/−10%, preferably by +/−5% and/or deviations in the form of changes which are insignificant to the function.

Further developments, advantages and possible applications are set out by the following description of exemplary embodiments and by the figures. All of the features described and/or pictured per se or in any combination are fundamentally the subject-matter of the disclosure, independently of their combination in the claims or references back thereto. The content of the claims is also made an integral part of the description.

BRIEF DESCRIPTION OF THE DRAWINGS

The disclosed subject matter is explained in greater detail below on the basis of the figures with reference to exemplary embodiments, wherein.

DETAILED DESCRIPTION

Figure 1:
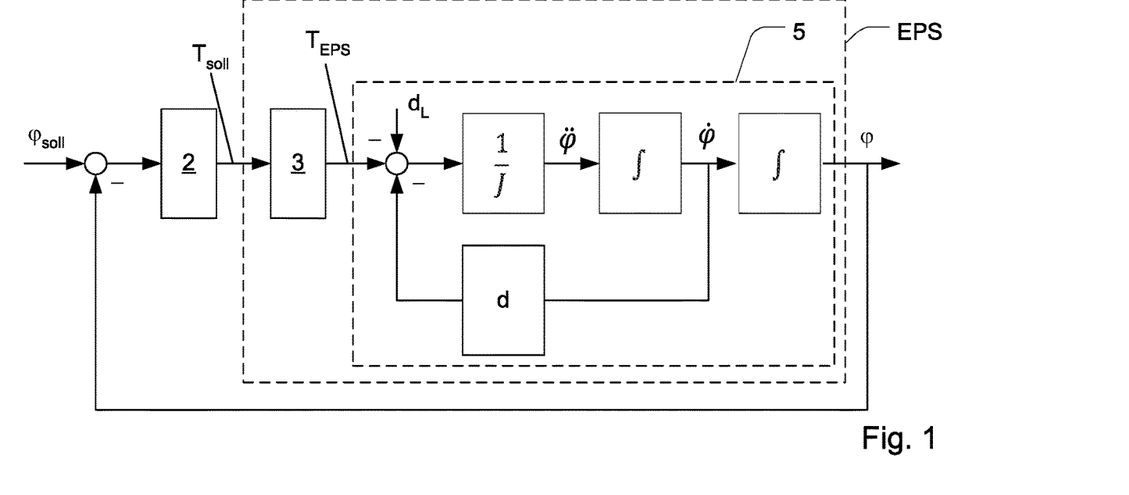
FIG. 1 shows by way of example a schematic representation of a control circuit of an electromechanical steering system of a vehicle.

FIG. 1 shows by way of example a schematic block diagram of a control circuit of a steering device EPS having an electromechanical drive, in which a program-controlled electric motor supports the steering movements of the driver or carries out at least partially inherent steering movements during autonomous or partially autonomous driving.

In the block wiring diagram, the block designated with the number 2 represents the steering angle controller, the block designated with the number 3 represents the motor and the block designated with the reference numeral 5 represents a control engineering reproduction of the steering mechanics. Together with the motor 3, the steering mechanics form the electromechanical steering device EPS.

The control circuit obtains, for example, the nominal steering angle $\varphi_{soll}$ which is provided for example by an electronic control unit, in particular a computer unit controlling an autonomous or partially autonomous driving function, as input information. The term "nominal steering angle information" is also used here for the nominal steering angle $\varphi_{soll}$.

Following the subtraction point of the control circuit, at which the nominal steering angle $\varphi_{soll}$ is amended based on the actual steering angle $\varphi$, a first controller unit 2 is provided, which provides for example a nominal actuating torque $T_{soll}$. The first controller unit 2 is for example a PID controller, as depicted by way of example in FIG. 3. In particular, the first control unit 2 has an integrating component. This leads to the nominal actuating torque increasing continually if a difference between the nominal steering angle $\varphi_{soll}$ and the actual steering angle $\varphi$ is adjusted. This is for example the case if the human driver selects a different steering angle at the steering wheel to the nominal steering angle $\varphi_{soll}$ over a longer period of time. This results in an unwanted way in a continually increasing steering force which the driver has to exert in order to hold the steering angle that deviates from the nominal steering angle $\varphi_{soll}$. This represents unnatural driving behavior for the driver and is therefore perceived as disturbing.

The first controller unit 2 is for example a self-contained or enclosed controller unit which does not make possible an interface for supplying external control signals, via which the control behavior could be influenced in a manner that depends on the driving conditions and/or the situation, in particular depending on the driving commands of the human driver. Consequently, it is not possible to compensate for the disturbing control behavior arising inter alia from the integrating component directly at the first controller unit 2.

The output side of the first control unit 2 is coupled to the motor 3. This is in particular an electric actuator which provides the steering forces for the mechanical steering system of the vehicle. The motor 3 receives a nominal actuating torque $T_{soll}$, which is converted by the motor 3 into a motor steering torque $T_{EPS}$, from the first control unit 2 for example. The steering torque $T_{EPS}$ is the actual torque that is transferred by the motor 3 to the steering. The steering torque $T_{EPS}$ can either be measured directly or can be determined indirectly via the current intensity of the current which flows through the motor 3, since a direct or substantially direct proportionality exists between the current intensity and the steering torque $T_{EPS}$ produced by the motor.

In FIG. 1, the reference numeral 5 denotes the mechanical steering system which is schematically depicted as a regulating model. The regulating model of the mechanical steering system 5 can for example be reproduced as an $IT_1$ element. It firstly contains a point of difference to which the steering torque $T_{EPS}$ produced by the motor, the disturbance variable $d_L$ and an internal feedback variable, here the first derivative of the steering angle $\varphi'$ multiplied by the friction d, is supplied.

The disturbance variable $d_L$ can be any external disturbance variable (rut, road gradient, transverse forces due to cornering, additional moments which are generated by the motor due to steering assistance functions of the EPS, etc.) and/or the steering torque applied to the steering wheel by the human driver via a steering movement.

The output variable of the control circuit is the actual steering angle $\varphi$, which is fed back to the point of difference lying before the input of the first controller unit 2.

The disturbance variable $d_L$ is compensated for by the integrating component in the steering angle regulation. This leads to the integrating component being built up. Based on the assumed $IT_1$ structure, the following is produced for the motor steering torque $T_{EPS}$:

$$T_{EPS} = j\ddot{\varphi} + d\dot{\varphi} + d_L. \qquad \text{(Formula 1)}$$

It is obvious from formula 1 that the disturbance variable $d_L$ leading to the buildup of the integrating component is also reflected in the steering torque $T_{EPS}$ produced by the motor. I.e., the feedback of the steering torque $T_{EPS}$ produced by the motor is suitable for compensating for the buildup of the integrating component in the first controller unit 2.

Alternatively, it is also possible to use the nominal actuating torque $T_{soll}$, instead of or in addition to the steering torque $T_{EPS}$ produced by the motor, as the variable to be fed back, since the nominal actuating torque $T_{soll}$ also contains information about the integrating component which is building up. This is in particular advantageous if no information regarding the current steering torque $T_{EPS}$ produced by the motor is available, at least temporarily.

Figure 3:
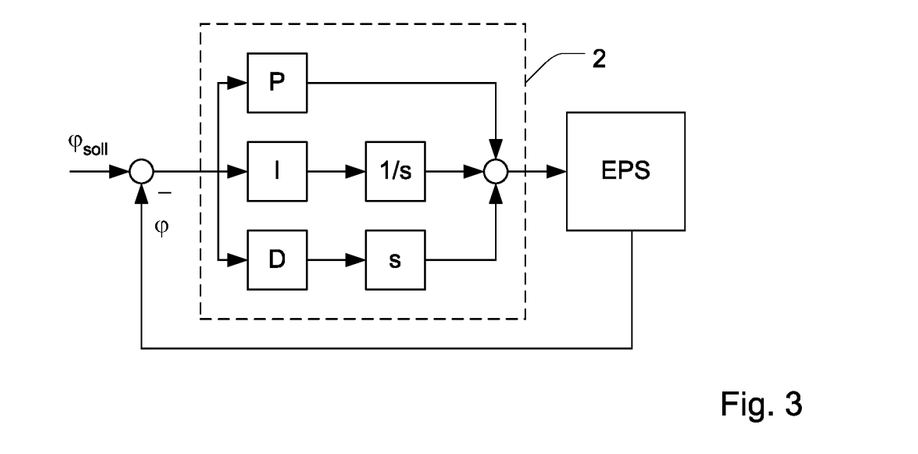
FIG. 3 shows by way of example and schematically the control circuit according to FIG. 1, in which a first controller unit is configured as a PID controller.

The following transfer function is thus produced for the control circuit according to FIG. 1 in conjunction with FIG. 3:

$$\varphi/\varphi_{soll} = Ds^2 + Ps + 1/J_s{}^3 + (d+D)s^2 + Ps + 1; \qquad \text{(Formula 2)}$$

Figure 2:
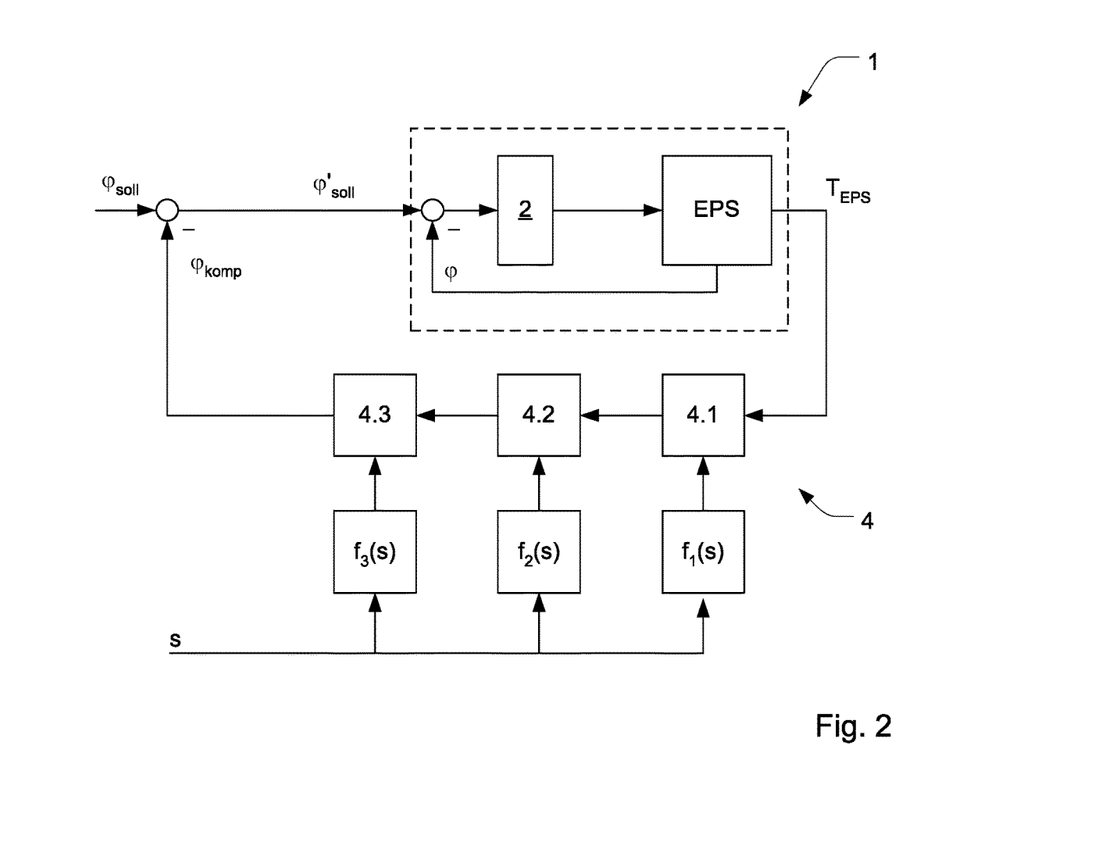
FIG. 2 shows by way of example a schematic representation of a control circuit of an electromechanical steering system of a vehicle which has a superposed compensation control circuit.

FIG. 2 shows a regulating device 1, in which the control circuit shown in FIG. 1 is superposed by a compensation control circuit having a feedback path 4 in order to be able to mitigate or prevent the disturbing effects of the steering angle regulation if, due to lack of influence possibilities, this is not directly possible at the first controller unit 2.

In the exemplary embodiment shown, the steering torque $T_{EPS}$ produced by the motor is supplied to the feedback path 4 of the compensation control circuit as the input variable. Alternatively, as explained above, the nominal actuating torque $T_{soll}$ can also be used as the input variable. The feedback path of the compensation control circuit provides steering angle compensation information as the output variable. Said information is supplied to a subtraction point, so that the first steering angle information $\varphi'_{soll}$, also referred to as compensated nominal steering angle information, arise from the nominal steering angle information $\varphi_{soll}$ by subtracting the steering angle compensation information. This first steering angle information $\varphi'_{soll}$ should then in turn serve as input information for the control circuit of the steering device EPS.

The feedback path 4 of the compensation control circuit can contain one or more control elements, by means of which different regulating functions are executed. It is understood that even more complex regulating structures can be used, which illustrate the functionality of multiple control elements in a physical controller.

In the exemplary embodiment shown, three control elements 4.1, 4.2, 4.3 are provided. It is understood that this purely serves as one example and more or fewer regulating elements can also be provided.

The first control element 4.1 is for example configured as a dead zone, i.e., an output signal deviating from zero is not output until the input signal of the first control element 4.1 has exceeded or fallen below a threshold. After exceeding the threshold, there can be a linear relationship between the input information and the output information. The threshold as of which the compensation control circuit should become active can therefore be specified by the first control element 4.1.

The threshold of the first control element 4.1 can be modifiable, and indeed preferably depending on one or more control variables s.

The at least one control variable s can either be transferred directly to the first control element 4.1 as the input variable or can be converted into control information which is dependent on the control variable s via a first mathematical function $f_1(s)$, which control information is then transferred to the first control element 4.1 in order to modify the threshold.

The feedback path 4 of the compensation control circuit can have a further, second control element 4.2 which preferably receives the output information of the first control element 4.1 as input information. The second control element 4.2 has a transfer function GT which has low-pass behavior for example. The second control element 4.2 can be configured for example as a $PT_1$ element or as a $PT_x$ element of a higher order (i.e., $x \in \{2, 3, 4, \ldots\}$). Other regulating functions with low-pass behavior are also fundamentally conceivable. Components above a cutoff frequency are filtered out by the low-pass behavior. As a result, low-frequency components, i.e., slow changes in the steering angle come into play to a greater extent so that the cause for the growing nominal actuating torques resulting from the integrating component is therefore back-coupled and, as a result, a more natural steering behavior is achieved. Alternatively, other transfer functions for example can also be used, for example those that arise from standard design methods such as e.g., pole-zero compensation, state controller, etc.

The control behavior of the second control element 4.2 can be modifiable, and indeed preferably in turn depending on one or more control variables s.

The at least one control variable s can either be transferred directly to the second control element 4.2 as the input variable or can be converted into control information which is dependent on the control variable s via a second mathematical function $f_2(s)$, which control information is then transferred to the second control element 4.2 in order to modify the control properties.

The feedback path 4 of the compensation control circuit can have a further, third control element 4.3 which preferably receives the output information of the second control element 4.2 as input information. The third control element 4.3 can for example be configured as a limiter, also referred to as a saturation element. The limiter preferably serves to restrict the amplitude of the feedback information (in particular the output signal of the second control element 4.2) in order to avoid feedback values which are too high for safety reasons.

The third control element 4.3 preferably has a threshold as of which the amplitude is limited. This threshold can be modifiable, and indeed preferably depending on one or more control variables s.

The at least one control variable s can either be transferred directly to the third control element 4.1 as the input variable or can be converted into control information which is dependent on the control variable s via a third mathematical function $f_3(s)$, which control information is then transferred to the third control element 4.3 in order to modify the threshold.

One or more monotonically nondecreasing or nonincreasing functions can be used as the first to third mathematical functions $f_1(s)$ to $f_3(s)$, which functions influence the influence of the at least one control variable s on the respective control element 4.1 to 4.3. Deviating from the monotonically nondecreasing or nonincreasing functions indicated, other types of functions can also be used, for example quadratic functions.

In the event that multiple different control variables s are used, the mathematical functions $f_1(s)$ to $f_3(s)$ can also have multiple functional parts, wherein one control variable s is used in each case as the input variable for a functional part and, as a result, the overall result of the respective mathematical function $f_1(s)$ to $f_3(s)$ can be influenced by multiple control variables.

One or more of the items of information indicated below can be used as the control variable s:

- The steering torque applied by the human driver to the steering wheel. The width of the dead zone can therefore be decreased for example as the steering torque of the human driver increases in order to thereby avoid the driver being corrected by the first controller unit 2 as a disturbance.
- The steering angle speed, i.e., the speed with which the steering angle is changed, in order to decrease the threshold of the dead zone, i.e., the width of the dead zone, as the steering speed increases, and to optionally increase the amplification of the transfer function GT of the second control element 4.2 and thus avoid an overshoot on the basis of the too heavily loaded I component.
- The bend curvature (i.e., the reciprocal of the bend radius of the bend driven through), in order to decrease the threshold of the dead zone, i.e., the width of the dead zone, and thus avoid oscillations, as the bend curvature lowers.

The vehicle speed, in order to be able to make the adaptions of the control elements 4.1 to 4.3 at least partially speed-dependent.

The disclosed subject matter has been described above with reference to exemplary embodiments. It is understood that numerous amendments and variations are possible, without departing from the scope of protection defined by the claims.

The invention claimed is:

1. A regulating device for regulating the steering angle of a vehicle, comprising:
   a first controller unit, the regulating behavior of which has at least one integrating component, wherein the first controller unit is configured to receive a control difference between first steering angle information, which is deduced from nominal steering angle information, and an actual steering angle and to provide actuation information for a motor operating the steering,
   a compensation control circuit superposed on the first controller unit, wherein the compensation control circuit has a feedback path which receives actuation information of the motor, the output torque of the motor, and/or information dependent on the output torque of the motor as the input variable and, based on said input variable, provides steering angle compensation information, wherein, based on the steering angle compensation information, an adjustment of the nominal steering angle information is effected to the first steering angle information and wherein the control behavior of the compensation control circuit can be modified depending on at least one control variable, wherein the control variable is an influence quantity of the human driver on the steering device and/or a driving situation-dependent measured variable;
   wherein the input variable of the feedback path of the compensation control circuit is at least one of nominal torque information of the first controller unit, the current intensity of the electric current flowing through the motor, and measurement information proportional to the current intensity.

2. The regulating device according to claim 1, wherein the first controller unit includes a PID controller.

3. The regulating device according to claim 1, wherein the first controller unit is a self-contained controller unit which does not have an external interface via which the control behavior of the first controller unit can be adjusted.

4. The regulating device according to claim 1, wherein the feedback path of the compensation control circuit has a first control element which is configured as a threshold-dependent dead zone.

5. The regulating device according to claim 4, wherein the threshold of the dead zone can be modified depending on the at least one control variable.

6. The regulating device according to claim 4, wherein the regulating device is configured to calculate the threshold of the dead zone based on a first mathematical function depending on the at least one control variable.

7. The regulating device according to claim 1, wherein the feedback path of the compensation control circuit has a second control element which is configured as a low-pass filter.

8. The regulating device according to claim 7, wherein the control behavior of the second control element can be modified depending on the at least one control variable.

9. The regulating device according to claim 8, wherein the regulating device is configured to calculate the control behavior of the second control element based on a second mathematical function depending on the at least one control variable.

10. The regulating device according to claim 1, wherein the feedback path of the compensation control circuit has a third control element which is configured as a limiter.

11. The regulating device according to claim 10, wherein the limiter has a threshold as of which the amplitude of the output signal is limited and the threshold can be modified depending on the at least one control variable.

12. The regulating device according to claim 11, wherein the regulating device is configured to calculate the threshold of the third control element based on a third mathematical function depending on the at least one control variable.

13. A regulating device for regulating the steering angle of a vehicle, comprising:
   a first controller unit, the regulating behavior of which has at least one integrating component, wherein the first controller unit is configured to receive a control difference between first steering angle information, which is deduced from nominal steering angle information, and an actual steering angle and to provide actuation information for a motor operating the steering; and
   a compensation control circuit superposed on the first controller unit, wherein the compensation control circuit has a feedback path which receives actuation information of the motor, the output torque of the motor, and/or information dependent on the output torque of the motor as the input variable and, based on said input variable, provides steering angle compensation information, wherein, based on the steering angle compensation information, an adjustment of the nominal steering angle information is effected to the first steering angle information and wherein the control behavior of the compensation control circuit can be modified depending on at least one control variable, wherein the control variable is an influence quantity of the human driver on the steering device and/or a driving situation-dependent measured variable, wherein the feedback path of the compensation control circuit has a first control element which is configured as a threshold-dependent dead zone, and wherein the threshold of the dead zone can be modified depending on the at least one control variable.

14. The regulating device according to claim 13, wherein the regulating device is configured to calculate the threshold of the dead zone based on a first mathematical function depending on the at least one control variable.

15. A regulating device for regulating the steering angle of a vehicle, comprising:
   a first controller unit, the regulating behavior of which has at least one integrating component, wherein the first controller unit is configured to receive a control difference between first steering angle information, which is deduced from nominal steering angle information, and an actual steering angle and to provide actuation information for a motor operating the steering; and
   a compensation control circuit superposed on the first controller unit, wherein the compensation control circuit has a feedback path which receives actuation information of the motor, the output torque of the motor, and/or information dependent on the output torque of the motor as the input variable and, based on said input variable, provides steering angle compensation information, wherein, based on the steering angle compensation information, an adjustment of the nominal steering angle information is effected to the first steering angle information and wherein the control behavior of the compensation control circuit can be modified depending on at least one control variable, wherein the control variable is an influence quantity of the human driver on the steering device and/or a driving situation-dependent measured variable, wherein the feedback path of the compensation control circuit has a third control element which is configured as a limiter, and wherein the limiter has a threshold as of which the amplitude of the output signal is limited and the threshold can be modified depending on the at least one control variable.

16. The regulating device according to claim 15, wherein the regulating device is configured to calculate the threshold of the third control element based on a third mathematical function depending on the at least one control variable.

* * * * *